United States Patent Office 2,890,838
Patented June 16, 1959

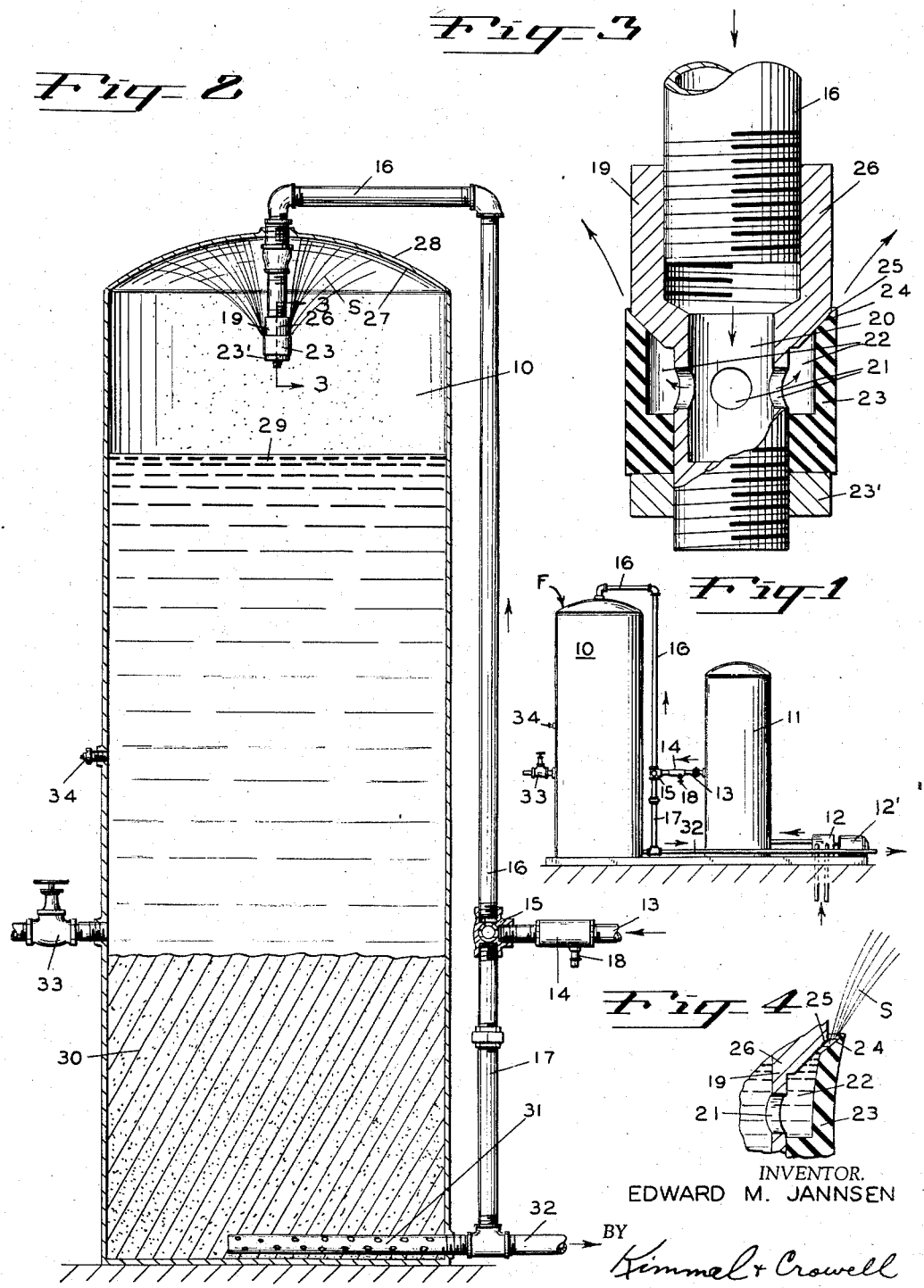

2,890,838
DEVICE FOR FILTER SEPARATING IRON FROM WATER

Edward M. Jannsen, Aloha, Oreg.

Application February 7, 1958, Serial No. 713,941

1 Claim. (Cl. 239—534)

This invention relates to filters and particularly devices for removing iron from water in water systems.

The primary object of the invention is to provide a filter apparatus for removing iron primarily from domestic water. Water derived from wells, springs and small streams in many locations contains iron in amounts detrimental to porcelain, clothing, fixtures and the like, and such amounts are also believed to be non-beneficial to the health of users.

Other objects and advantages will become apparent in the following specification when considered in light of the attached drawings in which:

Figure 1 is a side elevation of the invention shown connected to the usual pressure tank associated with water systems.

Figure 2 is a vertical sectional view on an enlarged scale of the invention.

Figure 3 is an enlarged fragmentary vertical sectional view taken on line 3—3 of Figure 2, looking in the direction of the arrows.

Figure 4 is a fragmentary detail view similar to Figure 3, showing water being forced out through the spray valve.

Referring now to the drawings in detail wherein like reference characters indicate like parts throughout the several figures, the reference character F indicates generally a filter constructed in accordance with the invention. The filter F, for removing iron from water, includes a tank 10. To provide a supply for the filter tank 10, a supply tank 11 is employed. The tank 10 usually exists in the regular present day water system.

In the event water is pumped from a well, a water pump 12 operated by an electric motor 12' pumps water into the supply tank 11, or in its absence directly into the filter tank 10. The pump 12 and the tank 11 are the component parts of a conventional well type water supply system.

When water is pumped into the tank 11 a head of air exists providing a pressure for delivering water into the filter F at a constant pressure.

Water is delivered through pipe 13, an air aspirator 14 into a three-way valve 15 selectively to either pipe 16 or pipe 17. When delivered into the pipe 16, the valve 15 will be in the position shown in Figure 2. A predetermined percentage of air is entrained in the water by the aspirator 14 having an air intake 18.

From the pipe 16 the water is delivered to a spray valve 19 and passes down through an axial bore 20 therein. Water flows outwardly through openings 21 into a chamber 22 formed in a cylindrical resilient hollow body 23 mounted on the valve 19. The upper end of the body 23 is cone shaped as at 24, and contacts cone shaped lower end 25 of the valve body 26.

A nut 23' contacts the body 23 to adjust the seating of the cone shaped lower end 25 into the cone 24 of the resilient body 23 to open only under a predetermined pressure, depending upon the type of spray desired to oxidize the water for removing the iron therefrom, which will be further described later on.

The water passes out of the bore 20 through the openings 21 into the chamber 22 and out between the cone surfaces 24 and 25 in the form of a vaporized spray S, Figures 2 and 4. The spray S mixes with the air contained within the tank 10 as it strikes the undersurface 27 of the top 28 of the tank 10. The iron then settles down through the water 29 contained in the tank 10 into the filtering material 30, remaining therein allowing the water 29 within the tank 10 to pass down through the filtering material 30 and out the perforated pipe 31, into the main pipe line 32 leading to its destination for use.

After a period of use, the filtering material 30 becomes filled or coated with iron, and it is then desirable to flush this iron out of the tank 10 in the following manner. The valve 15 is rotated to close off both pipes 16 and 17 from the supply pipe line 13. The drain valve 33 is opened allowing the water 29 within the tank 10 to drain therefrom, also an air bleeding inlet 34 is opened to assist in the draining away of this water 29 through the drain valve 33.

When the water 29 is completely drained out, the inlet 34 is closed, the valve 15 is opened to connect the supply line 13 with the pipe 17 to cause water from the supply line 13 to flow through the pipe 17 and out through the perforated pipe 31. This flushes the iron up through the filtering material 30, flushing the same out through the valve 33. This operation is carried on until the iron is completely washed out of the filtering material 30.

When this occurs the valve 33 is closed and the valve 15 is moved to the position in the drawings for causing the supply from the pipe 13 to pass up through the pipe 16 and out through the spray valve 19, causing the water to spray under the surface 27 of the top of the tank 28 and removing the iron from the water and filling the tank 10 approximately to the point shown in Figure 2, as above described. The system is then ready to operate under normal conditions.

Having thus described the preferred embodiment of the invention it should be understood that numerous modifications and adaptations may be resorted to without departing from the scope of the appended claim.

What is claimed is:

An inlet valve structure comprising a hollow cylindrical body, an externally threaded reduced diameter hollow extension integrally formed on one end of said body, said extension having the end thereof remote from said body closed, said body having an annular conical valve seat formed thereon adjacent the juncture of said body and said extension, said extension having a plurality of transverse bores extending therethrough, and a flexible valve member detachably secured to said extension in engagement with said valve seat, said valve member incuding a cylindrical body having an axial bore in one end thereof for engagement over said extension and a second somewhat larger axial bore in the opposite end thereof arranged in radially spaced overlying relation to the transverse bores in said extension, a conical valve seat formed in the end of said valve member through which said larger axial bore extends, and a nut threaded on said extension engaging said valve member at the end thereof opposite said valve seat thereon adjustably securing said valve member on said extension with its valve seat engaged against the valve seat on said body.

References Cited in the file of this patent

UNITED STATES PATENTS

| | | |
|---|---|---|
| 605,152 | Twitchell | June 7, 1898 |
| 1,802,726 | Levine | Apr. 28, 1931 |
| 2,237,882 | Lawlor et al. | Apr. 8, 1941 |
| 2,563,337 | Jaeger | Aug. 7, 1951 |

FOREIGN PATENTS

| | | |
|---|---|---|
| 126,325 | Great Britain | May 15, 1919 |